(12) United States Patent
Naumann et al.

(10) Patent No.: US 12,508,913 B2
(45) Date of Patent: Dec. 30, 2025

(54) METHOD FOR DETERMINING AN AVAILABLE AMOUNT OF ENERGY OF A VEHICLE BATTERY FOR AN EMERGENCY PULSE, BATTERY MONITORING DEVICE AND MOTOR VEHICLE

(71) Applicants: AUDI AG, Ingolstadt (DE); VOLKSWAGEN AKTIENGESELLSCHAFT, Wolfsburg (DE)

(72) Inventors: Rolf Naumann, Michelau (DE); Marco Baumgarth, Vordorf (DE)

(73) Assignees: AUDI AG, Ingolstadt (DE); VOLKSWAGEN AKTIENGESELLSCHAFT, Wolfsburg (DE)

( * ) Notice: Subject to any disclaimer, the term of this patent is extended or adjusted under 35 U.S.C. 154(b) by 770 days.

(21) Appl. No.: 17/507,128

(22) Filed: Oct. 21, 2021

(65) Prior Publication Data
US 2022/0118855 A1 Apr. 21, 2022

(30) Foreign Application Priority Data
Oct. 21, 2020 (DE) .............. 10 2020 127 696.6

(51) Int. Cl.
*B60L 3/00* (2019.01)
*B60L 58/12* (2019.01)

(52) U.S. Cl.
CPC ........... *B60L 3/0046* (2013.01); *B60L 58/12* (2019.02); *B60L 2250/10* (2013.01)

(58) Field of Classification Search
CPC .............................. B60L 3/0046; B60L 58/12
See application file for complete search history.

(56) References Cited

U.S. PATENT DOCUMENTS

2003/0144779 A1\* 7/2003 Obayashi ................. H02J 1/14
307/10.1
2012/0099618 A1\* 4/2012 Nishi ........................ G01K 7/42
374/152

(Continued)

FOREIGN PATENT DOCUMENTS

| CN | 102472796 | 5/2012 |
| CN | 104777427 A | 7/2015 |
| CN | 105259511 A | 1/2016 |

(Continued)

OTHER PUBLICATIONS

German Office Action dated Sep. 30, 2021 from German Application No. 10 2020 127 696.6.

(Continued)

*Primary Examiner* — Karie O'Neill Apicella
(74) *Attorney, Agent, or Firm* — STAAS & HALSEY LLP

(57) ABSTRACT

An internal resistance value of a vehicle battery is determined from a measured ripple current. An actual energy content of the vehicle battery is determined from the internal resistance value and a predetermined battery characteristic curve. A temperature value of the vehicle battery is measured and an available amount of energy of the vehicle battery for an emergency pulse is determined based on the actual energy content, an actual discharge current of the vehicle battery and the measured temperature value.

19 Claims, 2 Drawing Sheets

(56) References Cited

U.S. PATENT DOCUMENTS

2019/0131809 A1* 5/2019 Park .................... G07C 5/0816
2019/0135112 A1* 5/2019 Johnson ................ B60L 3/0046

FOREIGN PATENT DOCUMENTS

CN         109839597      6/2019
DE   10 2017 221 248 A1   5/2019

OTHER PUBLICATIONS

Chinese Office Action dated Nov. 1, 2024 for Chinese Application No. 202111226389.8.
Chinese Office Action dated May 16, 2025 for parallel Chinese Application No. 202111226389.8.

* cited by examiner

METHOD FOR DETERMINING AN AVAILABLE AMOUNT OF ENERGY OF A VEHICLE BATTERY FOR AN EMERGENCY PULSE, BATTERY MONITORING DEVICE AND MOTOR VEHICLE

CROSS-REFERENCE TO RELATED APPLICATIONS

This application claims the benefit of German Application No. 10 2020 127 696.6, filed Oct. 21, 2020, in the German Intellectual Property Office, the disclosure of which is incorporated herein by reference.

BACKGROUND

Described below are a method for determining an available amount of energy of a vehicle battery for an emergency pulse, a battery monitoring device, which is formed to perform the method, and a motor vehicle with such a monitoring device.

For an energy supply in vehicles, a generator, a DC/DC converter in recent vehicle types, is typically available, which supplies an on-board network of the vehicle with energy. For a case of fault, for example the generator or DC/DC converter fails during drive, a vehicle battery has to ensure the supply of the safety-relevant systems, such as for example the brake and/or the steering, until parking of the vehicle. This energy or power requirement is typically referred to as emergency pulse. The emergency pulse can be designed to provide electrical energy for multiple steering movements of a current-assisted steering and/or a brake assistance, which can take several seconds up to several minutes.

Heretofore, classical vehicles were started from a pinion starter, which has indirectly performed a diagnosis of the vehicle battery before start of drive by a high starting current from the vehicle battery. Thus, a defective vehicle battery could be determined already before start of drive by poorly or non-starting. However, in modern vehicles, the starting operation is not or not always assisted by a pinion start and either not necessarily by the vehicle battery to be diagnosed. Accordingly, this simple approach of diagnosis does not apply and one does not obtain feedback about a defective vehicle battery.

From DE 10 2009 058 893 A1, a method for monitoring a state of charge of a chargeable battery is known, in which a state of charge value correlated with a state of charge is ascertained by current integration and in which a maximum value for limiting the ascertained state of charge value to the top and/or an average value for limiting the ascertained state of charge value to the bottom and/or a reference value for resetting the state of charge value are ascertained by battery parameters.

From DE 10 2017 221 248 A1, a method for determining an actual state of charge value of a battery is known, wherein a family of characteristics is provided, which indicates an internal resistance for the determined battery type depending on the state of charge for the determined battery type for respective different predetermined temperature ranges.

From DE 103 37 064 A1, a method and a device for determining and/or predicting a high-current loading capacity of a battery, in particular a starter battery, for a motor vehicle are known. Herein, parameters of a model of a battery impedance are performed by evaluating alternating portions of a battery current and a battery voltage.

SUMMARY

A method for determining an available amount of energy of a vehicle battery for an emergency pulse is described herein. For example, the method can be performed by a battery monitoring device, which can be formed as a control unit, in particular as a microcontroller. As step a), the method includes determining an internal resistance value of the vehicle battery from a measured ripple current. A superimposed alternating current or zero-mean alternating portions of a battery current and/or a battery voltage are meant by ripple current. For example, the ripple current can be measured on the vehicle battery or a vehicle on-board network. The step a) for determining the internal resistance value from the measured ripple current is known from the prior art, in particular from the above mentioned DE 103 37 064 A1. Subsequently, the method includes determining an actual energy content of the vehicle battery by the internal resistance value and a predetermined battery characteristic curve as step b), measuring a temperature value of the vehicle battery as step c) and determining the available amount of energy of the vehicle battery for the emergency pulse by the actual energy content, an actual dis-charge current of the vehicle battery and the measured temperature value as step d).

In other words, the internal resistance value of the vehicle battery is first determined from the measured ripple current by known approaches. Among other things, the ohmic portion of the vehicle battery can be derived via this determination approach, wherein the internal resistance can be used for prediction of a voltage drop at high current load, thus for a prediction of a power capacity of the vehicle battery. In particular, a voltage change occurring at the emergency pulse can be ascertained from the ascertained internal resistance value and a known current difference for determining the power capacity. Furthermore, besides the power capacity of the vehicle battery, the actual energy content or an actual charge content of the vehicle battery can also be determined from the internal resistance value by a predetermined battery characteristic curve. Herein, the battery characteristic curve can be predetermined from requirements and/or specifications of the vehicle battery, in particular from a construction of the vehicle battery. The battery characteristic curve can be determined from measurements. Subsequently, the temperature value of the vehicle battery, which can have an actual temperature of the vehicle battery, can be measured and be used together with the previously determined actual energy content and the actual discharge current of the vehicle battery to determine the available amount of energy, which is present in the vehicle battery for the emergency pulse. Due to the electrochemistry of the vehicle battery, the available amount of energy, for example the amount of current capable of being drawn, is not constant, but depending on the temperature and the actually flowing dis-charge current. Accordingly, the available amount of energy is not a constant quantity, but changes not only by charging and discharging, but also by the actual discharge current, wherein the actual discharge current strength is meant by discharge current. Thus, the available amount of energy can be determined by the above indicated characteristic quantities depending on the Arrhenius equation and/or the Peukert equation.

For example, the temperature value can be ascertained via a temperature sensor and the actual discharge current can be ascertained via a current sensor. An energy, in particular an electrical amount of charge, which can be present in the vehicle battery, is to be understood by an energy content or a charge content. The energy content or the charge content can be a numerical value with the physical unit "ampere-hours". Correspondingly, a numerical value of the internal resistance of the vehicle battery is also to be understood by the internal resistance value, which can for example be indicated with the physical unit "ohm". The current and/or the voltage of the vehicle battery are meant by available amount of energy, which is actually freely available and can be drawn from the vehicle battery for performing the emergency pulse.

By the method, there arises the advantage that the vehicle battery can be continuously monitored by the permanently applied ripples in the ripple current and the internal resistance value of the vehicle battery can be determined. Via an inference from the internal resistance value to the actual energy content, a diagnosis and prediction of the vehicle battery are possible at any point of time of the vehicle operation, in particular for providing an emergency pulse. Overall, one obtains a simple and inexpensive possibility of performing an energy and power diagnosis on the vehicle battery.

In the description of the embodiments, additional advantages arise.

An embodiment provides that after step d), there is further performed examining as step e) if the available amount of energy falls below a preset emergency energy threshold value, and as step f), if step e) is affirmed, generating a warning signal. In other words, an emergency energy threshold value is provided, which can for example be preset depending on an energy required for the emergency pulse, wherein the available amount of energy can be examined to the effect if it is above or below an emergency energy threshold value. If it is determined that the available amount of energy falls below the preset emergency energy threshold value, a warning signal can be generated. A safety buffer can be included in the emergency energy threshold value such that the emergency pulse can still be performed upon reaching the emergency energy threshold value. By this embodiment, the advantage arises that the warning signal can be timely generated before the available amount of energy is too low for performing the emergency pulse.

A display device of a vehicle and/or a vehicle control unit of the vehicle may be controlled by the warning signal, wherein the vehicle is set into an emergency operating mode by the vehicle control unit upon receiving the warning signal. In other words, a warning can be displayed on a display device of the vehicle, in particular of the vehicle, by the warning signal in that the method for determining the available amount of energy is performed, and/or a vehicle control unit can be controlled, which sets the vehicle into an emergency operating mode upon receiving the warning signal. Herein, an energy saving mode is for example meant by emergency operating mode, in which current-intensive functions of the vehicle, which are not safety-relevant, can be deactivated and/or a vehicle speed is limited such that the vehicle can still be safely brought to a stop. Hereby, the advantage arises that a safety for the vehicle, in particular a driver of the vehicle, can be increased.

Furthermore, the emergency threshold value may be preset by a preset emergency pulse energy and a preset end of discharge voltage of the vehicle battery. In other words, it is examined by the emergency energy threshold value if the available amount of energy is sufficient to be still able to ensure a supply of the systems for an emergency maneuver. Therein, besides the physical power of the emergency pulse, that is the emergency pulse energy, a minimum voltage and end of discharge energy, respectively, are also taken into account, which the vehicle battery still has to have before end of discharge. That means that not only a minimum energy and minimum voltage, respectively, for the emergency pulse are taken into account by the emergency energy threshold value, but also an end of discharge energy for the vehicle battery. Hereby, the advantage arises that enough energy can be taken into account to perform the emergency pulse, which increases a safety.

A further embodiment provides that a function of the actual energy content of the vehicle battery, in particular of an actual charge content of the vehicle battery, depending on an actual internal resistance of the vehicle battery is provided by the battery characteristic curve, wherein the battery characteristic curve is determined from at least one preceding measurement. In other words, a correlation of the actual internal resistance value with the actual energy content is provided by the battery characteristic curve. The battery characteristic curve can be predetermined by one or multiple measurements for the vehicle battery and thus provide a good estimation on the actual energy content. By this embodiment, the advantage arises that the energy content of the battery can be determined via the internal resistance value capable of being continuously determined, via which an energy diagnosis of the vehicle battery is allowed. The battery characteristic curve can be present in a data storage and for example be provided as a lookup table or a function of the energy content depending on the internal resistance value.

In a further embodiment, it is provided that the battery characteristic curve is preset depending on a manufacturer, a nominal capacity, a battery technology and/or a period of employment of the vehicle battery. In other words, the battery characteristic curve can be dependent on multiple battery variables, which are taken into account in the battery characteristic curve according to used vehicle battery. These battery variables can in particular be determined via preceding measurements. For example, it is meant by the battery technology if it is a wet battery, a gel battery or an absorbent glass material battery (AGM). By this embodiment, the advantage arises that the battery variables can be taken into account for the battery characteristic curve, whereby an accuracy in the determination of the actual energy content and thereby of the available amount of energy is improved.

In a further embodiment, it is provided that the actual energy content of the vehicle battery is ascertained in a preset critical battery characteristic curve range of the battery characteristic curve. A range of the battery characteristic curve is meant by critical battery characteristic curve range, for which a low energy content is ascertained, that is when the vehicle battery is almost empty. The critical battery characteristic curve range can for example be preset by an internal resistance threshold value in the battery characteristic curve, from which a low energy content is expected, which is still sufficient for the emergency pulse. By this embodiment, the advantage arises that the internal resistance value has a relatively fast change at dynamic load, that is upon discharge, in the battery characteristic curve range and thus an error in determining the energy content is low. Accordingly, an accuracy in determining the energy content can be improved.

A further embodiment provides that the actual discharge current is measured and/or preset by a preset discharge current value. In other words, for determining the available amount of energy, it is measured, with which discharge current the vehicle battery is discharged, and/or the discharge current can be preset by a discharge current value, which can in particular be chosen as high as a safety limit for determining the available amount of energy can be complied with. The discharge current value can be preset via typically occurring discharge currents, which are expected in the vehicle battery in a normal operation. By this embodiment, the advantage arises that the available amount of energy for the emergency pulse can be more accurately determined.

A further embodiment provides that before a start of a vehicle function, it is examined if the available amount of energy determined in step d) is sufficient for executing the vehicle function, wherein the start of the vehicle function is prevented if the available amount of energy is not sufficient for executing the vehicle function. That means that a vehicle function, which makes an increased request to the energy supply and for which the available amount of energy is not sufficient, can be disabled before function start. If it is determined that the available amount of energy is sufficient, the vehicle function can be enabled. A function for assistance, entertainment and/or comfort of a driver is meant by a vehicle function, such as for example a "remote park assist". Alternatively or additionally, the vehicle function can also include or assist a control of the vehicle, wherein the vehicle function may not be safety-relevant. For the determination if the amount of energy is sufficient for the vehicle function, a comparison of a predetermined function amount of energy, which is required for the vehicle function, to the available amount of energy can in particular be performed. By this embodiment, the advantage arises that additional energy can be saved, which can be provided to the emergency pulse.

A further embodiment provides that a power capacity of the vehicle battery is determined by the internal resistance value determined in step a) and Ohm's law, wherein a voltage change by the emergency pulse depending on the internal resistance value and on a current change known for the emergency pulse is determined for determining the power capacity. In other words, the voltage change or a voltage drop of the vehicle battery can be determined in that it is calculated by the internal resistance value and a known current consumption of the emergency pulse by Ohm's law. By this embodiment, the advantage arises that the power capacity of the battery can be simply and fast estimated.

A further aspect relates to a battery monitoring device, which is formed to perform a method according to any one of the preceding embodiments. The battery monitoring device can be provided as a control unit, in particular as a microcontroller. Hereby, the same advantages and possibilities of variation as in the method result.

A motor vehicle with a vehicle battery and a battery monitoring device are also described herein. For example, the vehicle battery can be a starter battery and/or a traction battery of the motor vehicle and in particular include a lead accumulator or a lithium ion accumulator. The motor vehicle may be an automobile, in particular as a passenger car or truck, or a passenger bus or motorbike.

The control device for the motor vehicle may be used in performing the method. The control device can be a data processing device or a processor, which is configured to perform an embodiment of the method. Hereto, the processor can be at least one microprocessor and/or at least one microcontroller and/or at least one FPGA (field programmable gate array) and/or at least one DSP (digital signal processor). Furthermore, the processor can execute program code, i.e., programmed to perform an embodiment of the method upon execution by the processor. The program code can be stored in a data storage accessed by the processor.

Developments of the battery monitoring device include features, as they have already been described in context of the developments of the method. For this reason, the corresponding developments of the battery monitoring device are not again described here.

Also, combinations of the features of the described embodiments are included. Thus, each combination of the features of multiple of the described embodiments may be combined, if the embodiments have not been described as mutually exclusive.

BRIEF DESCRIPTION OF THE DRAWINGS

In the following, embodiments are described along with other aspects and advantages that will become more apparent and more readily appreciated with reference to the accompanying drawings of which.

DETAILED DESCRIPTION

Figure 1:
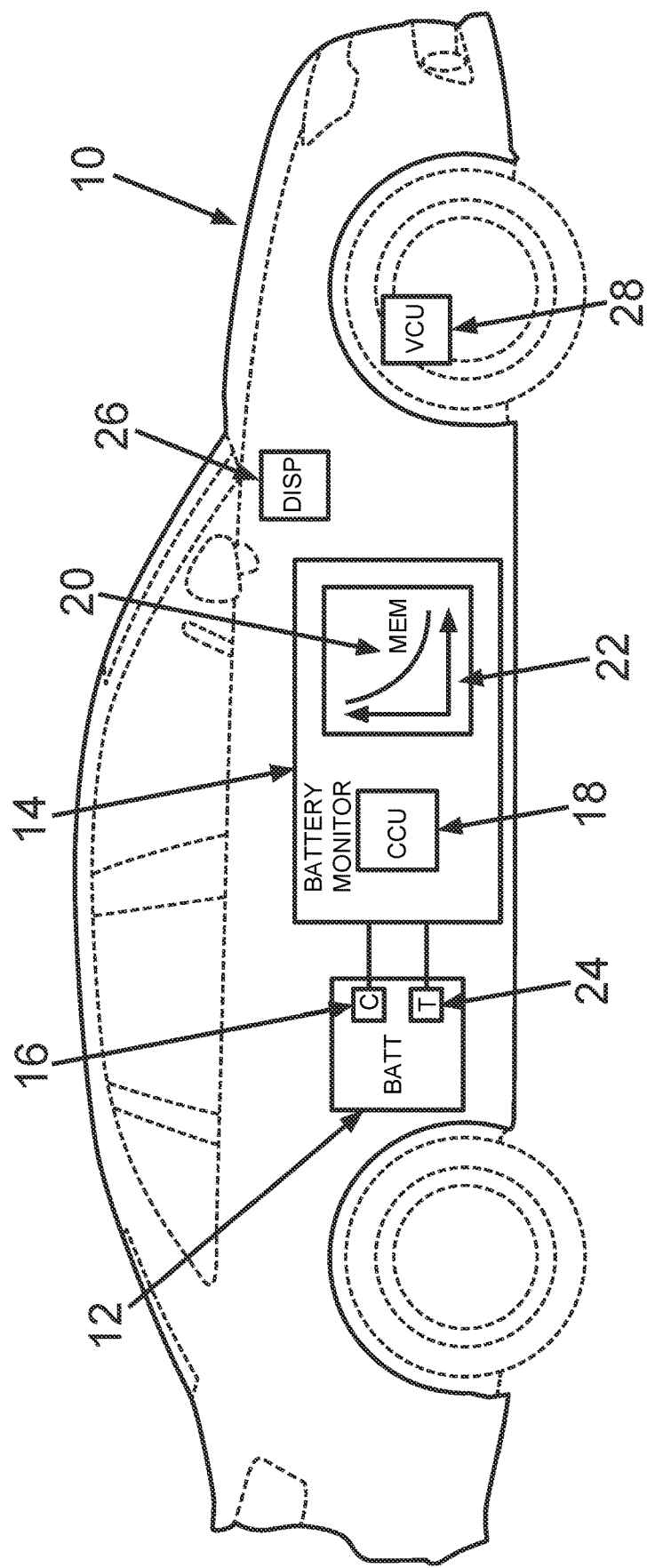
FIG. 1 a schematically illustrated motor vehicle with a battery monitoring device according to an exemplary embodiment.

The embodiments explained in the following include described components of the embodiments which each represent individual features to be considered independently of each other, which also each develop the invention independently of each other. Therefore, the disclosure also is to include combinations of the features of the embodiments other than the illustrated ones. Furthermore, the described embodiments can also be supplemented by further ones of the already described features.

In the figures, identical reference characters each denote functionally identical elements.

In FIG. 1, a schematized motor vehicle 10 with a vehicle battery 12 and a battery monitoring device 14 is illustrated according to an exemplary embodiment. The vehicle battery 12 can be a lead accumulator, which provides electrical energy for an energy supply of a vehicle on-board network. The battery monitoring device 14 can be arranged at or in the vehicle battery 12, wherein the battery monitoring device 14 can be formed for determining an available amount of energy for an emergency pulse. Herein, the current supply of the safety-relevant vehicle systems with electrical energy by the vehicle battery 12 is meant by emergency pulse.

In order to determine if an available amount of energy in the vehicle battery 12 is still sufficient for the emergency pulse, the battery monitoring device 14 can comprise a current sensor 16, which can be formed to measure a current of the vehicle battery 12. In particular, a superimposed alternating current of the vehicle battery 12, a so-called ripple current, can be measured. From the measured ripple current, the battery monitoring device 14 can determine an actual internal resistance value of the vehicle battery 12 by known methods. Hereto, the battery monitoring device 14 can for example comprise a central computing unit 18, which can for example be formed as a computer processor.

The battery monitoring device 14 can then determine an actual energy content of the vehicle battery 12 with the thus determination internal resistance value, in that the actual energy content is ascertained from a predetermined battery characteristic curve 20. Hereto, the central computing unit 18 of the battery monitoring device 14 can for example access an electronic data storage 22 of the battery monitoring device 14, on which the battery characteristic curve 20 can for example be recorded as a look-up table.

In particular, the battery characteristic curve 20 can provide a function of the actual energy content of the vehicle battery 12, in particular of a charge content of the vehicle battery 12, depending on the ascertained internal resistance and originate from a preceding measurement, which is determined depending on the manufacturer of the vehicle battery, a nominal capacity of the vehicle battery, a battery technology, for example AGM, and/or a period of employment of the vehicle battery, which can for example be known from a vehicle diagnosis system.

In particular, the determination of the actual energy content can be ascertained in a battery characteristic curve range of the battery characteristic curve 20, which represents a critical operating point. In this critical battery characteristic curve range, that is with poor vehicle battery, the energy content can be fast ascertained without additional dynamics. Furthermore, an assumed, constant relative error in the determination of the energy content in contrast to high assumed energy contents can be small in the critical battery characteristic curve range, whereby the error in the determination of the energy content can overall be minimized.

In addition, the battery monitoring device 14 can include a temperature sensor 24, which can be formed to measure a temperature value of the vehicle battery 12. That means that the temperature sensor 24 can determine the actual temperature of the vehicle battery 12 and can provide it to the battery monitoring device 14, in particular to the central computing unit 18, for further processing. Using the previously determined actual energy content, the measured temperature value and an actual discharge current of the vehicle battery 12, which can for example also be determined by the current sensor 16, an available amount of energy of the vehicle battery 12, which can be provided for the emergency pulse, can be determined by the battery monitoring device 14. Due to electro-chemistry of the vehicle battery 12, the available amount of energy, that is the amount of current capable of being drawn, can be not constant, but depending on the actual temperature of the vehicle battery 12 and the actually flowing discharge current strength. In other words, the available amount of energy can for example again rise although charging of the vehicle battery 12 did not occur, but only the discharge current has decreased or the temperature of the vehicle battery 12 has changed.

Subsequently, it can be examined by the battery monitoring device 14 whether or not the available amount of energy falls below a preset emergency energy threshold value. For example, the emergency energy threshold value can be preset from a preset emergency pulse energy, which is required for the emergency pulse, and a preset end of discharge energy, which has to be maintained as a minimum energy for the vehicle battery 12. If it is determined that the available amount of energy falls below the preset emergency energy threshold value, a warning signal can be generated by the battery monitoring device 14, by which a display device 26 of the vehicle 10 and/or a vehicle control unit 28 of the vehicle 10 can be controlled. The display device 26 can display a warning to a driver of the vehicle that the available amount of energy in the vehicle battery 12 is critical and the driver is to stop the vehicle 10 for safety reasons. Alternatively or additionally, the vehicle control unit 28 can set the vehicle 10 into an emergency operating mode by receiving the warning signal, whereby the vehicle 10 can for example be braked, which can additionally increase a safety for the vehicle 10.

Figure 2:
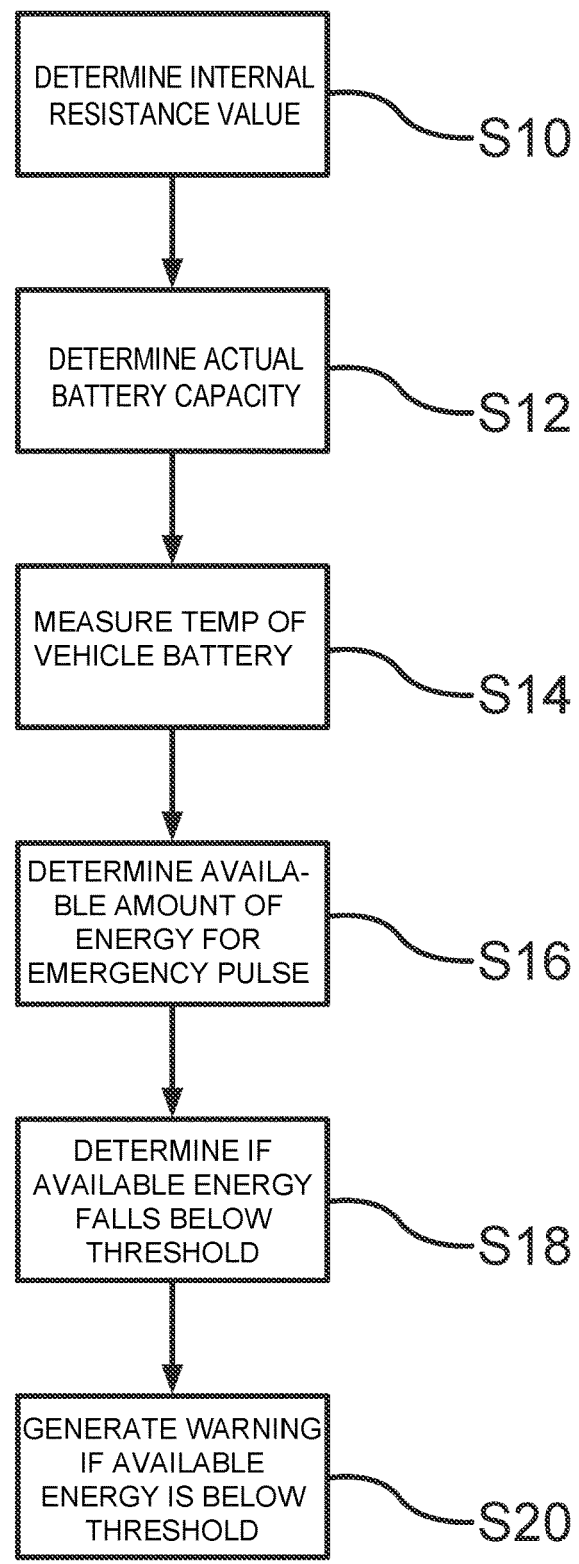
FIG. 2 a schematic method diagram according to an exemplary embodiment.

In FIG. 2, a schematic method diagram for determining an available amount of energy of the vehicle battery 10 for an emergency pulse is illustrated. In a step S10, an internal resistance value of the vehicle battery 12 can be determined from a measured ripple current. Subsequently, an actual energy content, that means an actual battery capacity, of the vehicle battery 12 can be determined by the internal resistance value and the predetermined battery characteristic curve 20 in a step S12.

Furthermore, a temperature value of the vehicle battery 12 can be measured in a step S14, and the available amount of energy of the vehicle battery 12, which can be provided for the emergency pulse, can be determined in a step S16, wherein the actual energy content, the actual discharge current of the vehicle battery and the measured temperature value can be used hereto.

In a step S18, it can additionally be examined if the available amount of energy, which has been determined in step S16, falls below a preset emergency energy threshold value, wherein a warning signal can be generated in step S20 if it has been determined in step S18 that the available amount of energy is below the preset emergency energy threshold value.

Overall, the examples show how an energy and power diagnosis of a vehicle battery 12 in a vehicle on-board network can be provided for a prediction of an emergency pulse A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

What is claimed is:

1. A method for determining an available amount of energy of a vehicle battery for an emergency pulse, comprising:
    determining an internal resistance value of the vehicle battery from a measured ripple current;
    determining an actual energy content of the vehicle battery by the internal resistance value and a predetermined battery characteristic curve;
    measuring a temperature value of the vehicle battery;
    determining the available amount of energy of the vehicle battery for the emergency pulse including a current supply of safety-relevant vehicle systems by the actual energy content, an actual discharge current of the vehicle battery and the temperature value obtained by said measuring; and
    generating a warning signal when the available amount of energy falls below a preset emergency energy threshold, the preset emergency energy threshold including a safety buffer to enable the emergency pulse to be performed when the available amount of energy falls below the preset emergency energy threshold; and
    controlling a display device of a vehicle in which the vehicle battery is installed to display the warning signal and controlling a control unit of the vehicle to limit at least one current-intensive function of the vehicle and the vehicle speed.

2. The method according to claim 1, further comprising:
    examining if the available amount of energy falls below the preset emergency energy threshold value; and generating the warning signal when the available amount of energy falls below the preset emergency energy threshold value.

3. The method according to claim 2, further comprising:
controlling at least one of a display device of a vehicle and a vehicle control unit of the vehicle by the warning signal; and
placing the vehicle into an emergency operating mode by the vehicle control unit upon receiving the warning signal.

4. The method according to claim 3, wherein the preset emergency energy threshold value is preset by a preset emergency pulse energy and a preset end of discharge energy of the vehicle battery.

5. The method according to claim 4, wherein the actual energy content of the vehicle battery is an actual charge content of the vehicle battery and depends on an actual internal resistance of the vehicle battery as defined by the predetermined battery characteristic curve, the predetermined battery characteristic curve being determined from at least one measurement value obtained prior to performing the method.

6. The method according to claim 5, wherein the predetermined battery characteristic curve is preset depending on at least one of a manufacturer, a nominal capacity, a battery technology and a period of employment of the vehicle battery.

7. The method according to claim 6, wherein the actual energy content of the vehicle battery is determined based on a preset critical battery characteristic curve range of the predetermined battery characteristic curve.

8. The method according to claim 7, further comprising obtaining the actual discharge current from one of measurement and a preset discharge current value.

9. The method according to claim 8, further comprising:
determining, before a start of a vehicle function, whether the available amount of energy is sufficient for execution of the vehicle function; and
preventing the start of the vehicle function when the available amount of energy is not sufficient for execution of the vehicle function.

10. The method according to claim 9, further comprising:
determining a power capacity of the vehicle battery based on the internal resistance value and Ohm's law; and
determining a voltage change by the emergency pulse depending on the internal resistance value and a current change known for the emergency pulse in determining the power capacity.

11. The method according to claim 2, wherein the preset emergency energy threshold value is preset by a preset emergency pulse energy and a preset end of discharge energy of the vehicle battery.

12. The method according to claim 1, wherein the actual energy content of the vehicle battery is an actual charge content of the vehicle battery and depends on an actual internal resistance of the vehicle battery as defined by the predetermined battery characteristic curve, the predetermined battery characteristic curve being determined from at least one measurement value obtained prior to performing the method.

13. The method according to claim 1, wherein the predetermined battery characteristic curve is preset depending on at least one of a manufacturer, a nominal capacity, a battery technology and a period of employment of the vehicle battery.

14. The method according to claim 1, wherein the actual energy content of the vehicle battery is determined based on a preset critical battery characteristic curve range of the predetermined battery characteristic curve.

15. The method according to claim 1, further comprising obtaining the actual discharge current from one of measurement and a preset discharge current value.

16. The method according to claim 1, further comprising:
determining, before a start of a vehicle function, whether the available amount of energy is sufficient for execution of the vehicle function; and
preventing the start of the vehicle function when the available amount of energy is not sufficient for execution of the vehicle function.

17. The method according to claim 1, further comprising:
determining a power capacity of the vehicle battery based on the internal resistance value and Ohm's law; and
determining a voltage change by the emergency pulse depending on the internal resistance value and a current change known for the emergency pulse in determining the power capacity.

18. A battery monitoring device for a vehicle battery, the battery monitoring device receiving a measured ripple current, comprising:
a current sensor detecting an actual discharge current of the vehicle battery;
a temperature sensor detecting a temperature value of the vehicle battery; and
a processor programmed to
determine an internal resistance value of the vehicle battery from the measured ripple current,
determine an actual energy content of the vehicle battery based on the internal resistance value and a predetermined battery characteristic curve,
determine an available amount of energy of the vehicle battery for an emergency pulse including a current supply of safety-relevant vehicle systems based on the actual energy content, the actual discharge current of the vehicle battery and the temperature value;
generate a warning signal when the available amount of energy falls below a preset emergency energy threshold, the preset emergency energy threshold including a safety buffer to enable the emergency pulse to be performed when the available amount of energy falls below the preset emergency energy threshold; and
control a display device of a vehicle in which the vehicle battery is installed to display the warning signal and control a control unit of the vehicle to limit at least one current-intensive function of the vehicle and the vehicle speed.

19. A motor vehicle, comprising:
an on-board network;
a vehicle battery;
a ripple current sensor detecting a ripple current in at least one of the on-board network and the vehicle battery; and
a battery monitoring device, including
a current sensor detecting an actual discharge current of the vehicle battery,
a temperature sensor detecting a temperature value of the vehicle battery, and
a processor programmed to
determine an internal resistance value of the vehicle battery from the measured ripple current,
determine an actual energy content of the vehicle battery based on the internal resistance value and a predetermined battery characteristic curve,
determine an available amount of energy of the vehicle battery for an emergency pulse including a current supply of safety-relevant vehicle systems based on the actual energy content, the actual discharge current of the vehicle battery and the temperature value;

generate a warning signal when the available amount of energy falls below a preset emergency energy threshold, the preset emergency energy threshold including a safety buffer to enable the emergency pulse to be performed when the available amount of energy falls below the preset emergency energy threshold; and control a display device of a vehicle in which the vehicle battery is installed to display the warning signal and control a control unit of the vehicle to limit at least one current-intensive function of the vehicle and the vehicle speed.

* * * * *